Oct. 1, 1963 H. WEINRICH 3,105,393
TRANSMISSION
Filed April 28, 1960 7 Sheets-Sheet 1
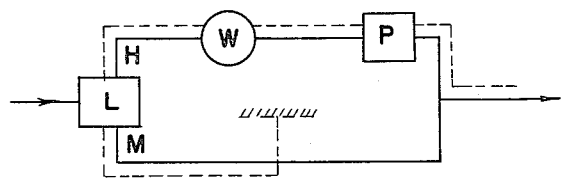
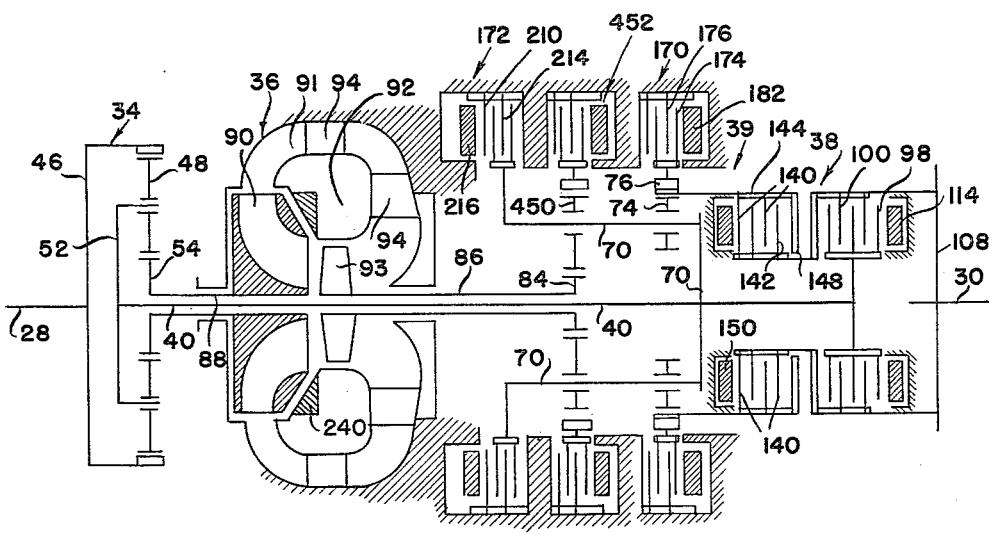
INVENTOR
Hellmut Weinrich
BY *Strauch Nolan & Neale*
ATTORNEYS

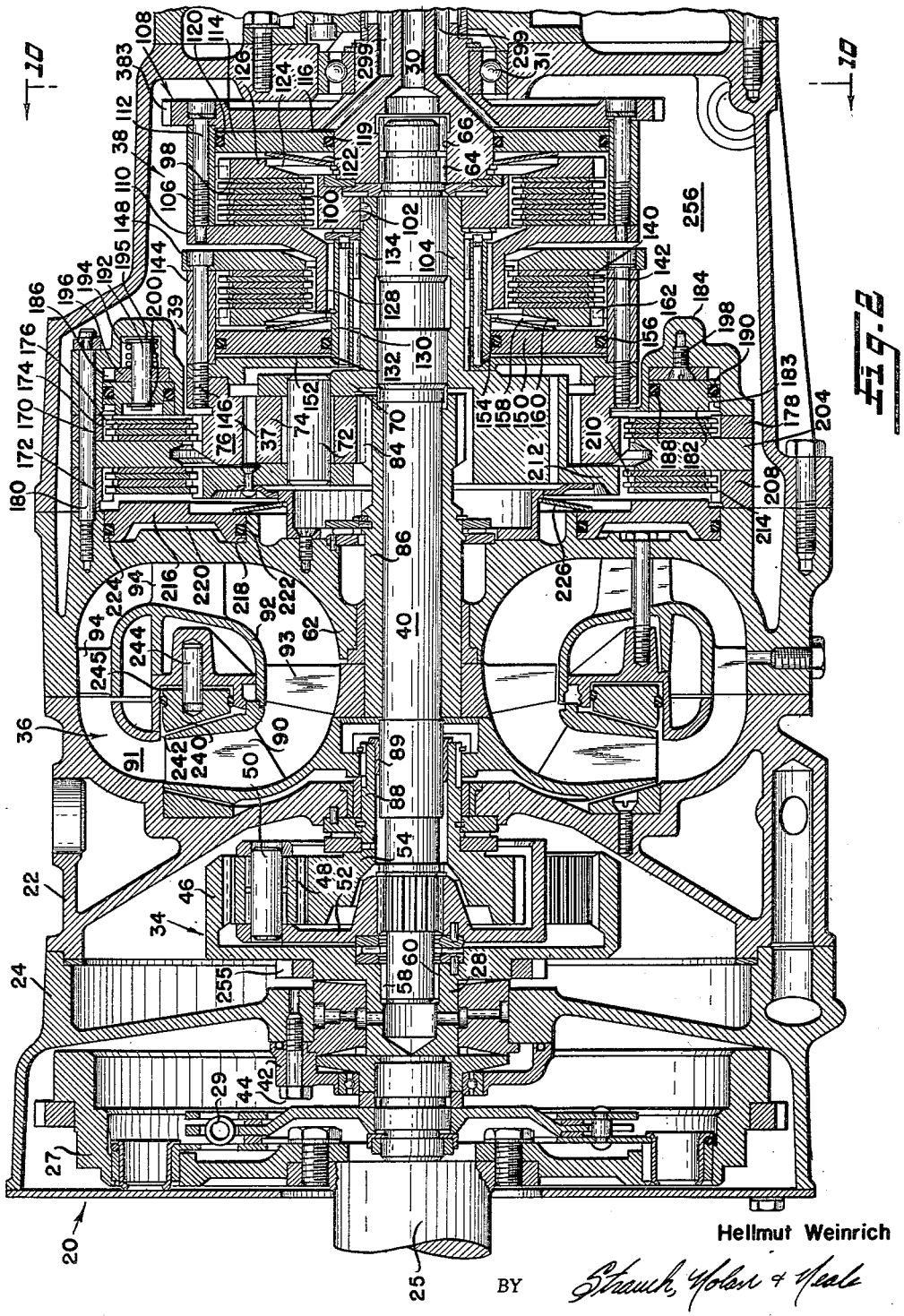

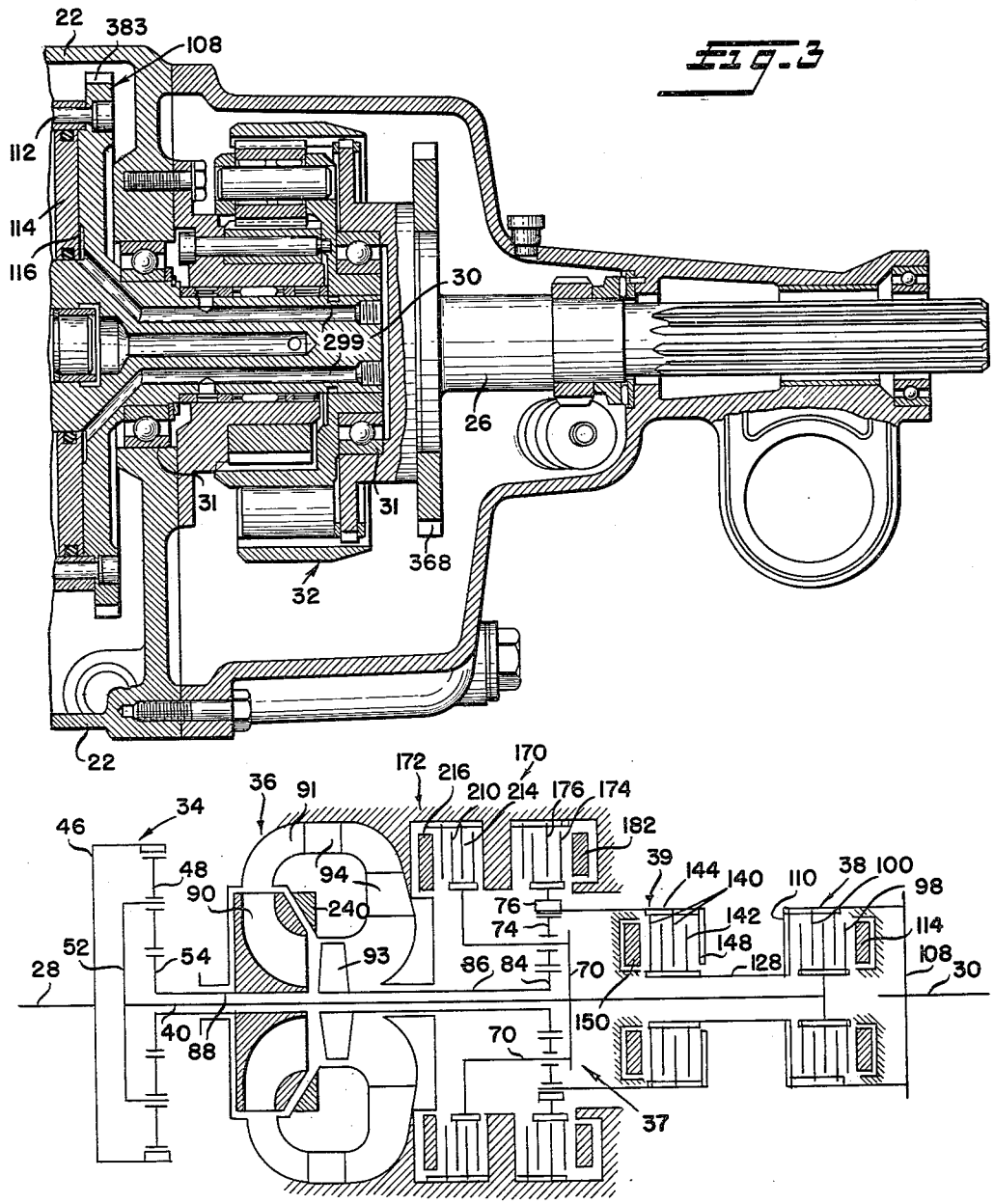

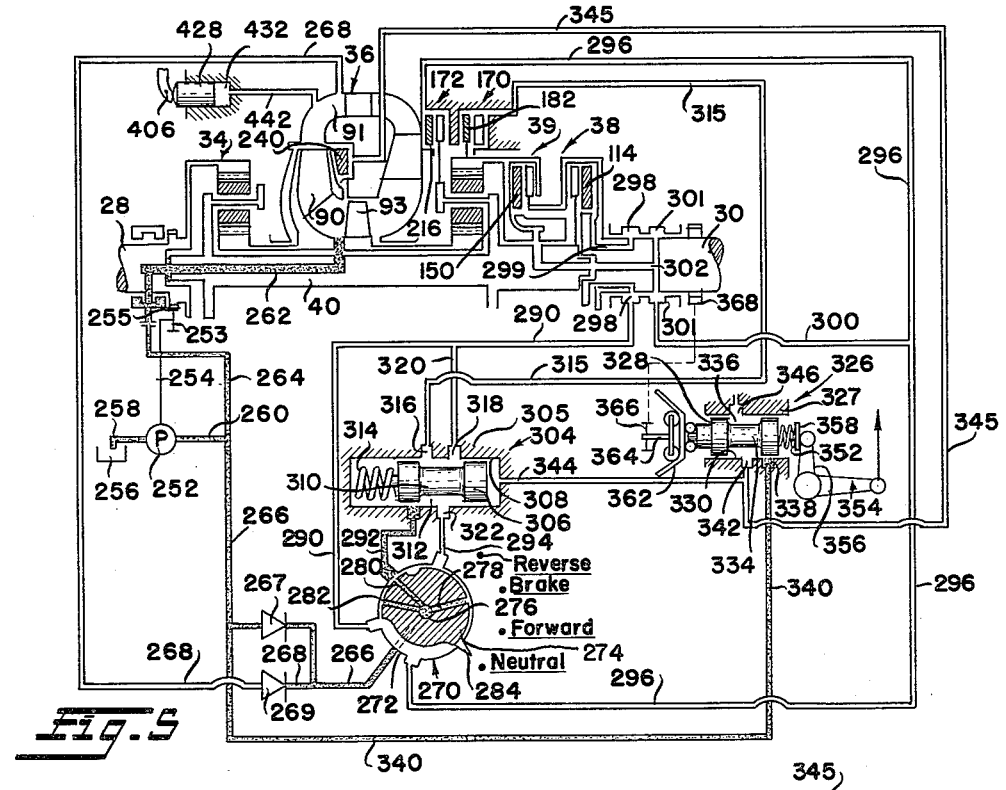
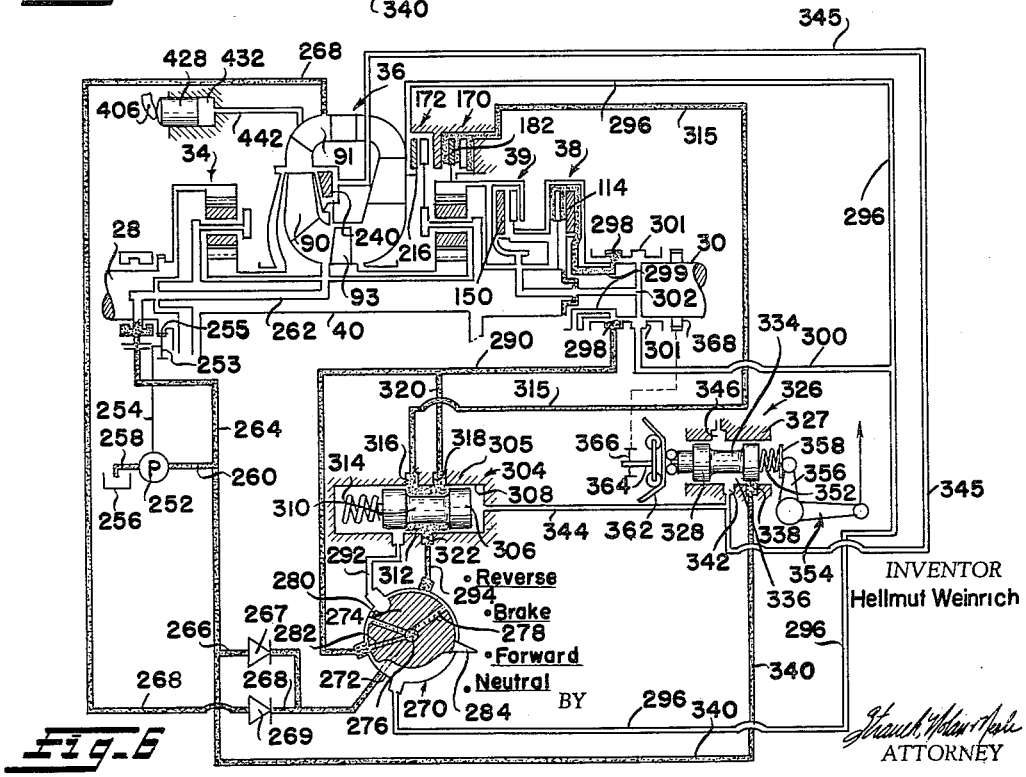

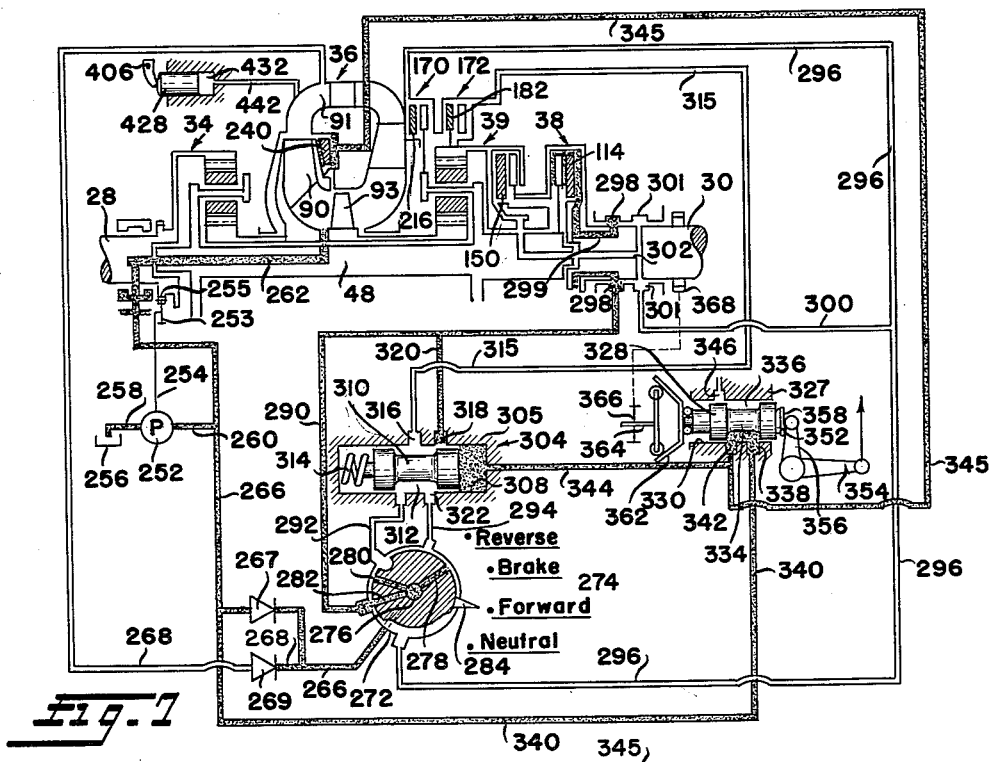
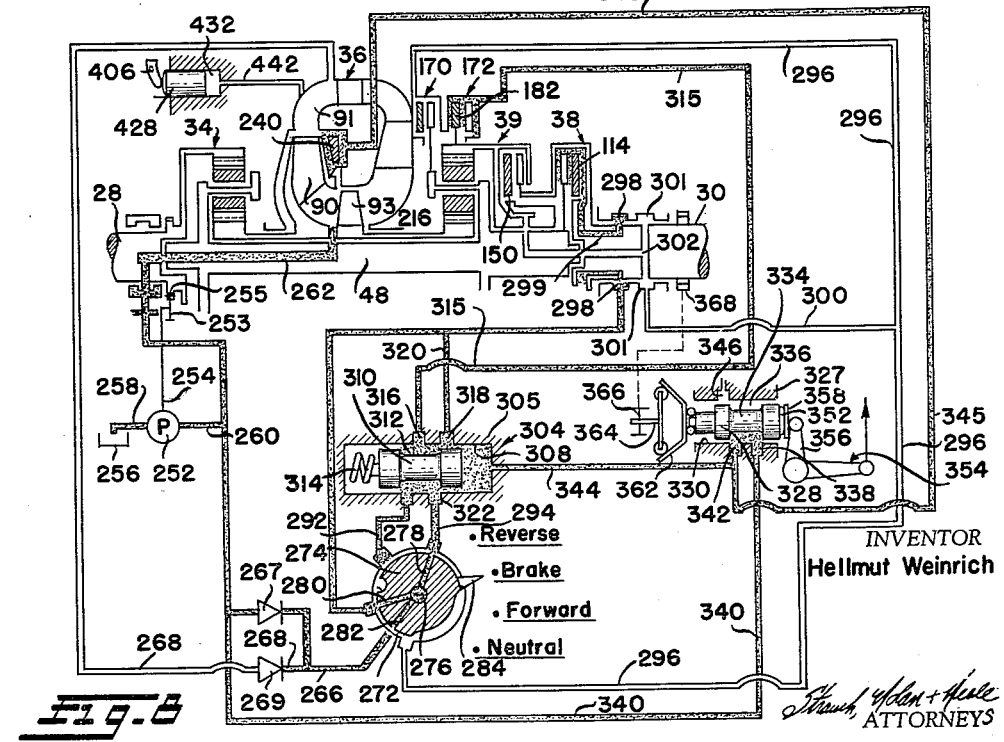

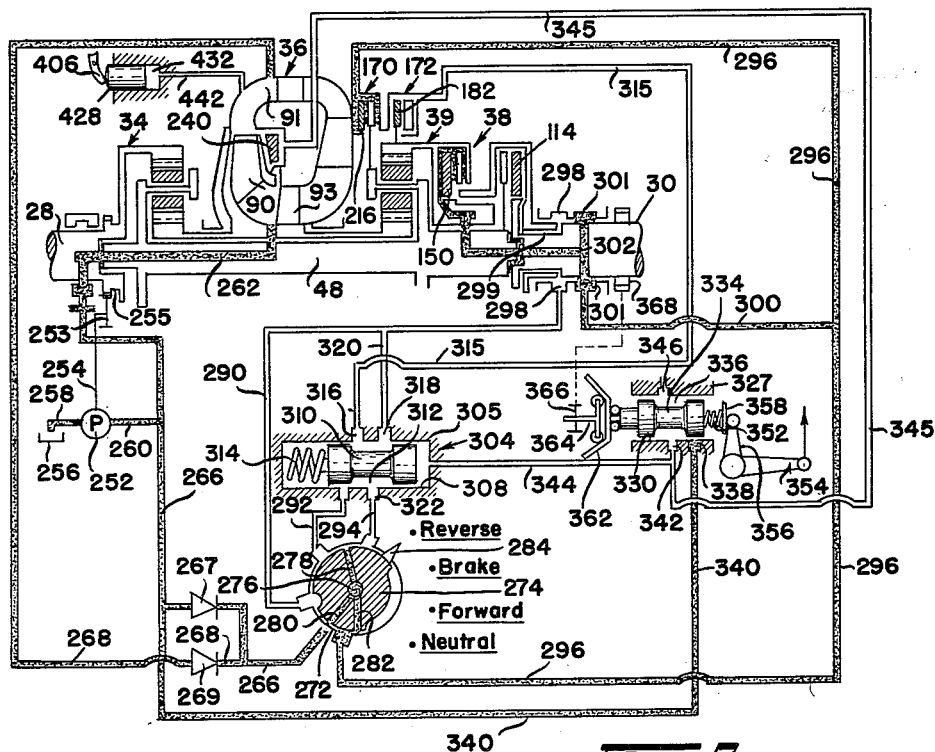
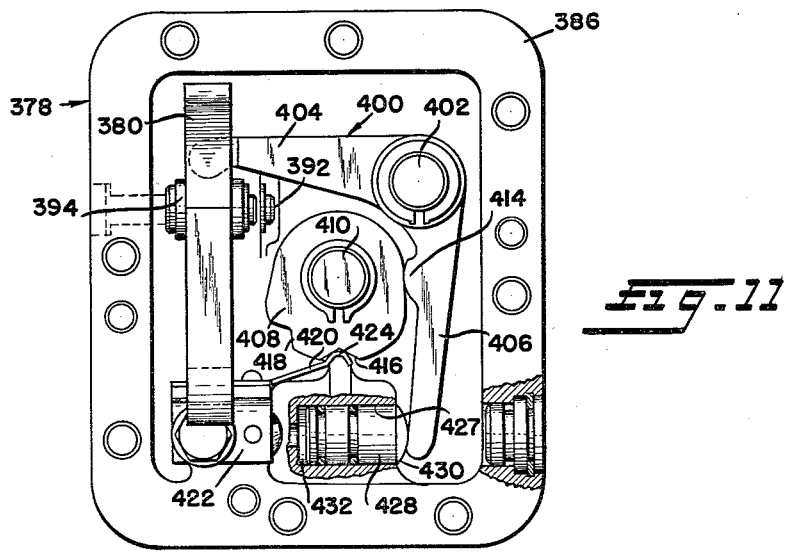
INVENTOR
Hellmut Weinrich

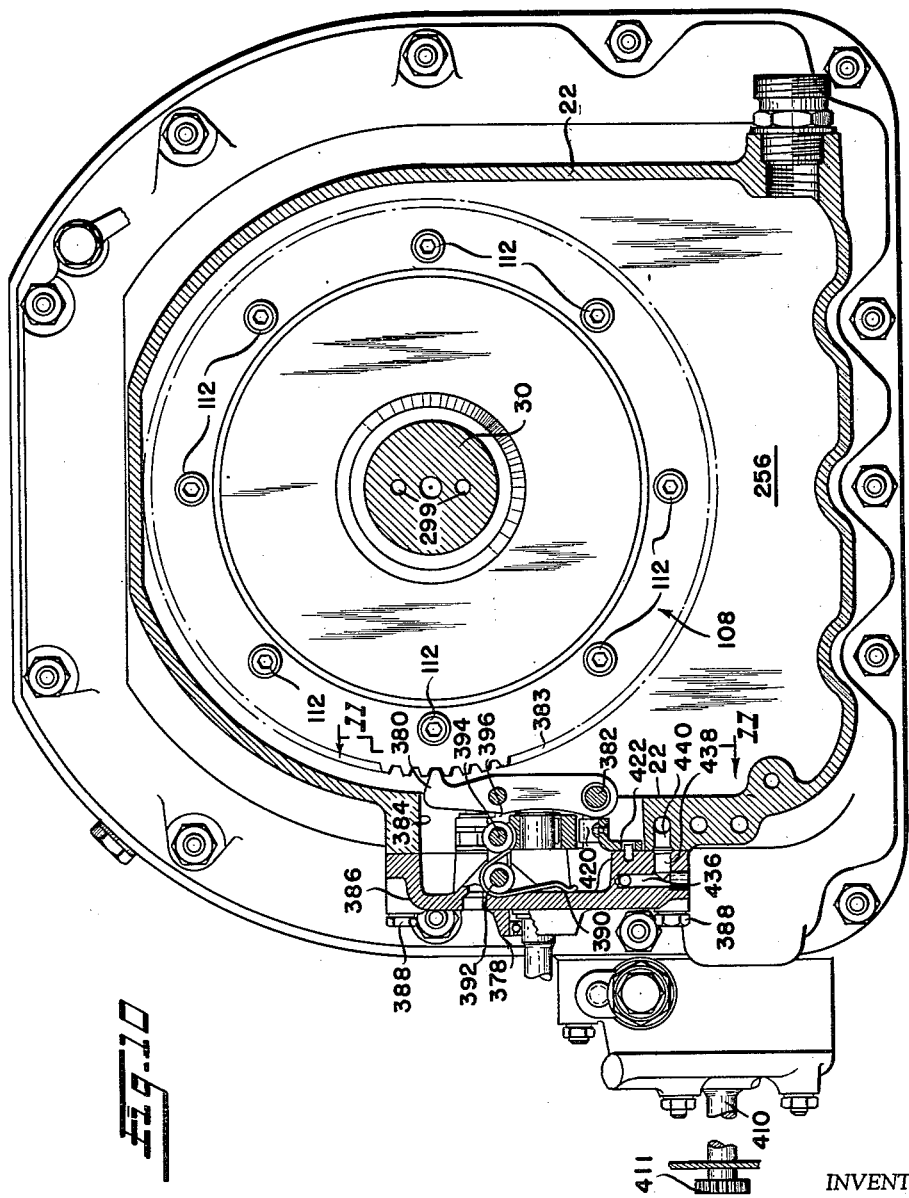

United States Patent Office 3,105,393
Patented Oct. 1, 1963

3,105,393
TRANSMISSION
Hellmut Weinrich, Pinneberg, Germany, assignor, by mesne assignments, to Voith-Getriebe, K.G., Heidenheim (Brenz), Germany, a corporation of Germany
Filed Apr. 28, 1960, Ser. No. 25,371
13 Claims. (Cl. 74—688)

The invention relates to improvements in transmissions and particularly to hydrodynamic power shunt transmissions wherein a power splitting differential gear is combined with a hydrodynamic torque converter.

This application is a continuation-in-part application of Serial No. 801,502, now abandoned, filed March 24, 1959, for Transmission.

In hydrodynamic power shunt transmissions in which the principles of the present invention are embodied, the transmission power input is divided and transmitted through the transmission by two power trains over a selected range of operation. Part of the power is transmitted mechanically through the transmission by a main shaft directly through a differential to the output shaft while the remainder of the power is divided or shunted to the output shaft through a torque converter. In transmissions of this type it has been proposed to arrange a planetary gear between the torque converter and the output shaft and to use this planetary gear as a step-up or step-down gear and also as a reversing gear for the output shaft. To this end the sun gear of the planetary gear is rigidly secured to the turbine wheel of the torque converter whereas the outer ring gear and the planet wheel carrier of the gear set can alternatively be locked against rotation or connected to the output shaft of the transmission by way of optionally operable locking and coupling means.

When thus reversing the direction of rotation of the output shaft the otherwise existing parallelism of the two power paths is annulled within the reversing gear and the momenta of the power paths are caused to work contrary to each other when re-combined in the output shaft. This results in materially decreasing the output torque of the transmission in one of the directions of rotation of the driven shaft.

To avoid this disadvantage which is highly undesirable, especially when employing the transmission in connection with vehicle driving engines, it has already been proposed to provide the usual planetary gear with an additional reversing gear that will transmit both power paths to the output shaft in parallelism with each other even after reversing this shaft. Such additional reversing gears, however, give a material increase in costs and dimensions of the whole transmission.

According to the present invention the planetary gear behind the converter of power splitting hydrodynamic transmissions of the kind referred to is arranged between the converter and the output shaft in such a manner that in one direction of rotation of the output shaft it will maintain the power splitting action of the transmission, whereas in the reversed rotation the power transmission is effected only via the converter. Thereby the power-decreasing operation of the two power paths contrary to each other after reversing is avoided, and thus at least that power part, which corresponds to the hydraulic path of the power transmission, is fully available for reverse driving. Furthermore, by this way the knock-down of engine speed which otherwise would be caused from the transmission's side is now prevented and this will likewise give an increase in output torque during reverse driving operation.

Constructionally the invention is of special advantage because it enables reversing of the driven shaft by the sole use of the already existing planetary gear. In this manner the invention avoids additional reverse gears which in known transmissions not only result in higher costs and large overall dimensions but also increase the undesired gear noises.

The invention can be preferably performed by rigidly securing the planet wheel carrier of the planetary gear behind the converter to the planet wheel carrier of the known power splitting differential gear and by optionally connecting the outer wheel or the planet wheel carrier of said first-named planetary gear to the output shaft according to the desired direction of rotation of such shaft. The planetary gear itself may be in the form of a single-stage or multi-stage shifting gear.

Accordingly, it is a primary object of the present invention to provide for a hydrodynamic power shunt transmission having separate parallel power trains coupling the power input and power output of the transmission wherein power is transmitted to the output by both power trains to drive the output in a selected direction over a predetermined range of output speeds and wherein power is delivered only by a selected one of the power trains to drive the output in the opposite direction.

A further object of the present invention resides in the provision of the power shunt transmission of the preceding object wherein a torque converter forms a part of the power train driving the output in the opposite direction.

Still a further object of the present invention resides in the provision of a novel hydrodynamic power shunt transmission having separate parallel trains adapted to transmit power from a transmission input to a transmission output wherein the output can be selectively coupled and uncoupled to the input thereby respectively permitting and interrupting delivery of power by the power trains for driving the output.

Still another object of the present invention is to provide a novel power shunt transmission having an input shaft and an output shaft, a dual output power splitting differential gear mechanism driven by the input shaft, a hydrodynamic torque converter connected to one of the outputs of the differential gear mechanism and a planetary gear mechanism connected to the output of the torque converter and to the other output of the differential mechanism such that the planetary gear mechanism is operable to transmit power to the output shaft in one direction by power splitting and in the other direction only by way of the torque converter.

A further object of the present invention resides in the provision of a novel transmission in a vehicle and having a manually manipulatable parking brake for selectively allowing and preventing rotation of the transmission output and means by which the parking brake is automatically disengaged from the transmission output whenever the vehicle is moved from rest position under its own power.

These and other objects of the present invention will presently become more fully apparent by reference to the appended claims and as the description proceeds in connection with the accompanying drawings, wherein:

FIGURE 1 is a schematic view of a power shunt transmission showing the power paths between the transmission input and output according to the present invention;

FIGURE 2 is a vertical sectional view illustrating the main portion of a transmission embodying the principles of the present invention;

FIGURE 3 is a vertical sectional view illustrating the extreme right-hand output side of the transmission shown in FIGURE 2;

FIGURE 4 is a schematic view of the transmission shown in FIGURES 2 and 3;

FIGURE 5 is a schematic view of the transmission illustrated in FIGURES 2-4 and showing the hydraulic control system for controlling the operation of the various brakes and clutches in the transmission in neutral position;

FIGURE 6 is a schematic view similar to FIGURE 5, but showing the component parts of the transmission and control system positioned for low speed forward movement of the vehicle;

FIGURE 7 is a schematic view similar to FIGURE 5, but showing the position of the component parts of the transmission and control system when the vehicle is moving in a high forward speed;

FIGURE 8 is a schematic view similar to FIGURE 5, but showing the component parts of the control system and the transmission in a position for braking the speed of the vehicle with the transmission when the vehicle is moving at high speed in a forward direction;

FIGURE 9 is a schematic view similar to FIGURE 5, but showing the component parts of the control system and the transmission positioned for a reverse movement of the vehicle (portions of the hydraulic control circuit illustrated in FIGURES 5-9 are shown with speckled lines to indicate presence of fluid under pressure so as to thereby simplify the description and operation of the control system);

FIGURE 10 is a section substantially along line 10—10 of FIGURE 2;

FIGURE 11 is a section substantially along the line 11—11 of FIGURE 10 with the transmission housing removed;

FIGURE 12 is a schematic view of a transmission according to a further embodiment of the present invention.

Referring now to FIGURE 1, in known transmissions of the kind described herein where the planetary gear P acts also as a reverse gear, the power is transmitted to the driven shaft in both directions of its rotation by splitting the input power into the hydraulic path H and into the mechanical path M and by re-combining these two paths as total power within the output shaft. This re-combination is obtained in one direction of rotation of the output shaft (in the case of motor vehicles when forward driving) in the form of the sum of both power paths, whereas, in reversing by means of the planetary gear P, the output power will be the difference between the two power parts, because, in this case, the momenta of the power paths will work in opposition to each other.

The resultant decrease in output during reverse rotation of the driven or output shaft (reverse drive in motor vehicles) is avoided according to the invention by such an arrangement and construction of the planetary gear P, that, in one direction of rotation of the driven shaft, this planetary gear maintains the usual power splitting action of the transmission (full lines), but in the other direction, by suitably locking one component part of the power-splitting differential gear L, requires the entire input power to take only the hydraulic path (dotted lines) via converter W and planetary gear P.

Referring now to FIGURES 2, 3, and 4 wherein the construction embodying the principles of the present invention is shown, reference numeral 20 generally designates a hydrodynamic power shunt transmission unit comprising a housing 22 having a removable end plate section 24 secured between housing 22 and a section of the engine housing (not shown). Transmission unit 20 drivingly interconnects a driving shaft 25, which may itself constitute the crankshaft of a vehicle engine (not shown), with a transmission driven shaft 26 (FIGURE 3) that is adapted to drive the wheels (not shown) of the vehicle. Bolted to crankshaft 25 is a fly wheel 27 which is drivingly connected to a transmission power input shaft 28 by means of a suitable coupling connection 29. A transmission power output shaft 30 is journalled for rotation in the opposite end of housing 22 coaxial with input shaft 28 by means of conventional ball bearings 31 and is connected to shaft 26 as by conventional planetary reduction gearing 32 as best shown in FIGURE 3.

According to the present invention two parallel torque transmitting power trains couple input shaft 28 with output shaft 30 and the principal components forming these parallel torque transmitting power trains include a power splitting epicyclic planetary gear set 34 having an input connected to input shaft 28 and two outputs. One output of planetary gear set 34 is connected through a torque converter 36 to a planetary gear set 37 which is connected by means of friction clutch assemblies 38 and 39 to output shaft 30. The other output of planetary gear set 34 is connected by means of an intermediate transmission shaft 40 to a separate input of planetary gear set 37, thereby forming the mechanical torque transmitting path of the transmission in parallel to the torque transmitting path through torque converter 36. Contrary to conventional transmissions of this type, output shaft 30 has no permanent connection with shafts 40 or 28.

Turning now to a more detailed description of the construction shown in FIGURES 2 and 3, input shaft 28 extends horizontally through end plate section 24 and a suitable oil seal assembly 42 secured to end plate section 24 as by machine screws 44. Shaft 28 is suitably journalled for rotation in end plate section 24 and terminates at its right hand end in an internal ring gear 46 which constitutes the input member of epicyclic planetary gear set 34. Ring gear 46 meshes with a plurality of equiangularly spaced apart planet gears 48 mounted for free rotation on pins 50 carried by a planetary carrier 52. Planet gears 48, in turn, are in constant meshing engagement with a sun gear 54.

By this planetary gear structure 34, the power input to the transmission unit 20 is divided into two parts. Part of the power input is transmitted through planetary gear carrier 52 which is non-rotatably fixed to intermediate transmission shaft 40.

Shaft 40 is journalled coaxial with input shaft 28 by means of a fixed sleeve bushing 58 of bearing material mounted concentrically in an axially extending bore 60 formed in shaft 28. Shaft 40 extends concentrically through the torque converter housing 62 of torque converter 36 and is journalled at its right hand end by means of a needle bearing 64 mounted in an axially extending bore 66 formed in transmission output shaft 30.

Non-rotatably secured to the right-hand end of shaft 40, as viewed from FIGURE 2, is the planet gear carrier 70 of planet gear set 37. Gear carrier 70 carries a plurality of equiangularly spaced pins 72 which are rigidly secured to carrier 70 and which rotatably mount a plurality of planet gears 74. Planet gears 74 constantly mesh with a ring gear 76 and with a sun gear 84 which is formed integral with a sleeve shaft 86 rotatably mounted on intermediate transmission shaft 40.

With continued reference to FIGURES 2 and 4, the other part of the divided power input not transmitted to shaft 40, is impressed upon sun gear 54 of planetary gear set 34 which is provided with an integral axial extending sleeve 88. Sleeve 88 is concentrically journalled on shaft 40 as by a bushing 89 formed of suitable bearing material and extends into torque converter housing 62.

Torque converter 36 is preferably of the form disclosed in my co-pending application Serial No. 781,495 filed December 19, 1958, and comprises a pump impeller 90 which is disposed in a toroidal fluid passageway 91 formed by a core 92 and is drivingly connected to sun gear sleeve 88. Driven by the energy produced by pump 90 is a reaction type turbine 93 which has its outlet positioned adjacent to the inlet of pump 90. A set of fixed guide vanes 94 are provided in passageway 91 between the outlet of pump 90 and the inlet of turbine 93 to eliminate the tangential component of flow of fluid with which it leaves pump 90 so that it enters turbine 93 in a substantially axial direction as fully described in said co-pending application.

Turbine 93 is drivingly secured to sleeve shaft 86 so that sun gear 84 of planetary gear set 37, which is rigid with sleeve 86 as hereinbefore described, is drivingly connected to sun gear 54 of planetary gear set 34 through torque converter 36.

Gear carrier 70 of planetary gear set 37 is drivingly connected to output shaft 30 by means of friction clutch assembly 38 which comprises axially spaced clutch driving discs 98 and clutch driven discs 100 positioned between clutch discs 98 for facial engagement therewith. Discs 98 are splined for axial sliding movement to the outer periphery of a collar 102 which is suitably keyed to an elongated hub 104 formed integral with gear carrier 70. Discs 100 are splined for axial sliding movement to the inner periphery of a clutch collar 106 which is mounted in concentric surrounding relationship to clutch discs 98 and 100 between a parking brake wheel 108 formed integral with output shaft 30 and an axially rigid backing plate 110. A plurality of machine screws 112 extending axially through wheel 108, collar 106 and plate 110 rigidly secure wheel 108, plate 110 and clutch collar 106 together as a unit.

In order to shift discs 98 and 100 to the left, as viewed from FIGURE 2, and in engagement with one another, to thereby couple gear carrier 70 with output shaft 30, an annular clutch actuating piston 114 is mounted for axial displacement coaxial with discs 98 and 100. Piston 114 is slidable over the outer periphery of output shaft 30 to the left of parking brake wheel 108 and the inner periphery of clutch collar 106 so as to form with shaft 32 and collar 106 a hydraulic fluid annular pressure chamber 116. To limit loss of fluid introduced in chamber 116 and to establish a fluid-tight expansible chamber, O-rings 119 and 120 are positioned in circumferential grooves formed respectively in the inner and outer peripheries of clutch piston 114. Thus, clutch piston 114 is axially shiftable to the left as viewed from FIGURE 2, by pressure fluid which is introduced into chamber 116 by means as will be hereinafter described.

With continued reference to FIGURES 2 and 4, clutch piston 114 is biased to the right by means of a disc spring 122 mounted on output shaft 30 and adapted to be urged by axial displacement of clutch piston 114 to the left into an annular recess 124 formed in a clutch pressure plate 126 which is mounted coaxially between clutch piston 114 and clutch discs 98 and 100 and splined for axial displacement to the inner periphery of clutch collar 106. Thus, it will be appreciated that clutch piston 114 is longitudinally shiftable against the bias of disc spring 122 by introduction of pressure fluid into the hydraulic pressure chamber 116 to press clutch discs 98 and 100 together between pressure plate 126 and backing plate 110 thereby drivingly coupling gear carrier 70 to output shaft 30.

Backing plate 110 is provided with an elongated hub 128 which is rotatably mounted on an elongated hub 130 of a flange member 132. By this structure backing plate 110 is axially held in position and is rotatable as a unit together with output shaft 30 and clutch collar 106. Flange member 132 is axially held against movement between gear carrier 70 and collar 102 and is rotatably mounted as by needle bearings 134 on the elongated hub portion 104 of gear carrier 70.

Ring gear 76 of planetary gear set 37 is coupled to backing plate 110 by means of friction clutch assembly 39 which comprises a set of driving clutch discs 140 and a set of driven clutch discs 142 positioned between discs 140 for facial engagement therewith. Discs 140 are splined for axial sliding movement on the outer periphery of the elongated hub 128 of backing plate 110. Discs 142 are splined to the inner periphery of a clutch collar 144 which is mounted in concentric surrounding relationship to discs 140 and 142 and is secured as by machine screws 146 axially between a clutch backing plate 148 and flange member 132. Screws 146 extend through plate 148, collar 144, flange member 132 so as to rigidly secure plate 148, collar 144, and flange member 132, to ring gear 76 together as a unit.

In order to shift clutch discs 140 and 142 to the right as viewed from FIGURE 2 and into engagement with one another to thereby couple ring gear 76 with backing plate 110, an annular clutch piston 150 is slidably mounted along flange member hub 130 and the inner periphery of clutch collar 144 coaxial with discs 140 and 142. Clutch piston 150 forms with clutch collar 144 and flange member 132 an expansible hydraulic fluid closed annular pressure chamber 152 concentric with shaft 40. Thus, to axially shift clutch piston 150 to the right as viewed from FIGURE 2, pressure fluid is introduced into chamber 152 as will be hereinafter described.

In order to seal pressure chamber 152, O-rings 154 and 156 are positioned respectively in circumferential grooves formed in the inner and outer peripheries of piston 150 in engagement with flange member hub portion 130 and clutch collar 144 respectively.

As shown in FIGURE 2, clutch piston 150 is biased to the left by means of a disc spring 158 which is concentrically mounted on flange member hub 130 and which is adapted to be urged by displacement of clutch piston 150 to the right into an annular recess 160 formed in a clutch pressure plate 162 coaxially positioned between clutch piston 150 and discs 140 and 142 and splined for axial displacement to the inner periphery of clutch collar 144. Thus, by axial displacement of clutch piston 150 to the right, discs 140 are drivingly engaged with discs 142 of clutch assembly 39 between plates 148 and 162.

When clutch 39 is engaged by axial displacement of clutch piston 150, ring gear 76 is drivingly coupled to backing plate 110 which is rotatable as a unit with output shaft 30 as hereinbefore described. When clutch 38 is engaged, gear carrier 70 is drivingly coupled to clutch collar 106 which is also rotatable as a unit with output shaft 30. Thus, it will be appreciated that by selective actuation of clutches 38 and 39, the transmission output shaft 30 can be optionally connected to either gear carrier 70 or to ring gear 76 of planetary gear set 37.

In order to selectively lock and prevent rotation of ring gear 76 and gear carrier 70 of planetary gear set 37, separately actuable brakes 170 and 172 are provided as best shown in FIGURES 2 and 4. Brake 170 for locking ring gear 76 against rotating comprises a set of braking discs 174 splined to the outer periphery of ring gear 76 in concentric relationship to shaft 40 and a set of discs 176 coaxially positioned between discs 174 for facial engagement therewith. Discs 176 are splined for axial sliding movement to the inner periphery of a collar 178 which is mounted rigid with housing 22 by means of a plurality of stud and nut assemblies 180.

In order to shift discs 174 and 176 into frictional engagement with one another, an annular brake piston 182 is provided and is axially slidably mounted in an annular recess 183 formed in a ring shaped cylinder 184 which is rigidly secured to housing 22 by means of the stud and nut assemblies 180. The walls of recess 183 form an expansible hydraulic fluid closed annular pressure chamber 186 with piston 182 coaxial with the axis of shaft 40. Thus, in order to axially displace piston 182 to the left as viewed from FIGURE 2, hydraulic pressure fluid is introduced into chamber 186 as will be described. To limit the loss of fluid introduced into chamber 186, O-rings 188 and 190 are positioned in circumferential grooves formed in the inner and outer peripheries of brake piston 182 in engaging relationship with the walls of cylinder recess 183.

One or a plurality of equiangular spaced guide pins 192 extend axially through brake piston 182 for maintaining the brake piston in axial alignment during displacement. Each pin 192 is biased to the right as viewed from FIGURE 2, by means of an externally supported coiled compression spring 194 surrounding pin 192 and which reacts between a ring 195 fixed on the right-hand end of pin 192 and a collar 196 fixedly secured to cylinder 184 by means of cap screws 198. A retainer ring 200 fixed on the end of each pin 192 extending beyond the left-hand recessed face of brake piston 182 abuts the recessed face of brake piston 182 so that spring 194 biases both pin 192 and brake piston 182 to the right as shown in FIGURE 2. Thus, brake piston 182 is longitudinally shiftable to the left, as viewed from FIGURE 2, together with guide pins 192 against the bias of springs 194 by introduction of pressure fluid into hydraulic pressure chamber 186 by means which will be hereinafter described. Limiting axial displacement of discs 174 and 176 is a backing plate 204 mounted on stud and nut assembly 180 and axially held in position between collar 178 of brake assembly 170 and a brake collar 208 of brake 172. Stud and nut assemblies 180 axially extend through plate 204 and collars 178 and 208 to secure these components as a unit to housing 22.

Brake 172 for locking gear carrier 70 against rotation comprises a set of braking discs 210 splined to the outer periphery of a ring shaped plate 212 which is fixedly secured to the free ends of planet gear pins 72 extending beyond planet gears 74. Positioned axially between discs 210 are a set of discs 214 which are splined to the inner periphery of collar 208 for axial displacement to frictionally engage with discs 210.

In order to axially shift discs 210 and 214 facially into engagement with one another to thereby lock gear carrier 70 against rotation, an annular brake piston 216 is mounted coaxial with discs 210 and 214 for axial sliding movement in an annular recess 218 formed in the right-hand side of torque converter housing 62. Brake piston 216 forms an expansible hydraulic fluid closed annular pressure chamber 220 with the walls of recess 218. Thus, by means of this structure, piston 216 is shiftable axially to the right as viewed from FIGURE 2 by introduction of pressure fluid into chamber 220 as will be described. To limit loss of pressure fluid introduced into chamber 220, O-rings 222 and 224 are respectively positioned in circumferential grooves formed in the inner and outer peripheries of brake piston 216 in engagement with the walls of recess 218.

As shown in FIGURE 2, brake piston 216 is biased to the left by means of a disc spring 226 mounted rigid with housing 22 in concentric relationship with shaft 40. Brake piston 216 is adapted to be urged by introduction of hydraulic pressure fluid into chamber 220 axially to the right against the bias of spring 226 so as to press discs 210 and 214 together and to thereby lock gear carrier 70 against rotation.

For rotation of output shaft 30, corresponding to forward motion of the vehicle, gear carrier brake 172 and clutch 39 associated with ring gear 76 are disengaged and ring gear brake 170 and clutch 38 associated with gear carrier 70 are engaged. Under these conditions, power is transmitted from the power splitting differential gear mechanism 34 to output shaft 30 by two parallel torque transmitting power trains. One power train is by way of pump 90 and turbine 93 of torque converter 36 and sun gear 84 of planetary gear set 37. Power is also transmitted by intermediate transmission shaft 40 to planet gear carrier 70 in parallel to the power transmitted through torque converter 36. Since ring gear brake 170 is restraining ring gear 76 against rotation, it will be appreciated that rotation of sun gear 84 will cause planet gears 74 to revolve about sun gear 84 thereby rotating planet gear carrier 70. Since clutch 38 is engaged, power delivered to gear carrier 70 by both power trains will therefore be transmitted to rotate output shaft 30.

Thus, it will be appreciated that the momenta of both power paths are in parallelism and output shaft 30 rotates with an output torque equal to the sum of the momenta of both power paths. This condition of operation corresponds, as hereinbefore described, to the forward drive of a motor vehicle equipped with such a transmission and follows the power paths indicated by full line in FIGURE 1.

For reverse drive, clutch 38 and ring gear brake 170 are disengaged and clutch 39 and gear carrier brake 172 are engaged. Under these conditions, it will be appreciated that intermediate transmission shaft 40 is locked against rotation by application of brake 172 and planet gears 74 are prevented from revolving about sun gear 84. Thus, power only is transmitted through torque converter 36 to rotate sleeve shaft 86 and sun gear 84 which causes rotation of planet gears 74 about their individual pins 72 to revolve ring gear 76. Since clutch 39 is engaged to couple ring gear 76 to output shaft 30, as hereinbefore described and since planetary gear carrier 70 is locked, it will be appreciated that shaft 30 will be rotated in the reverse direction. Thus, all of the power transmitted to output shaft 30 is now by way of torque converter 36 and ring gear 76 of planetary gear set 37. This condition of operation corresponds to the power flow shown by dotted lines in FIGURE 1.

By means of the above structure, the reverse speed according to the invention gives the additional advantage of assisting the ground-engaging wheel brakes of the vehicle in slowing the vehicle speed when driving down steep or long hills. Engagement of gear carrier brake 172 and clutch 39 during forward movement of the vehicle causes the momentum imparted to output shaft 30 by the road to counteract the momentum derived from the turbine sleeve shaft 86 of torque converter 36. By this counteraction, the braking of the vehicle will begin in a very soft and shockless manner since it acts entirely by way of the hydraulic path of the power transmission allowing the hydraulic fluid in the torque converter to cushion the braking action of the vehicle. On the other hand, the counteraction increases with increasing engine power and consequently acceleration of the input to ring gear 46 will result in a more effective braking action.

Disengagement of both clutches 38 and 39 fully interrupts the power flow between input shaft 28 and output shaft 30. If additionally, brakes 170 and 172 are disengaged, the driving engine (not shown) can run without being loaded by the transmission.

In order to selectively stop the rotation of pump 90 of torque converter 36, a braking system is provided as best shown in FIGURES 2 and 4, and comprises an annular brake piston 240 mounted within torque converter core 92. Piston 240 is axially slidably mounted in an annular recess 242 formed in core 92 and is secured against rotation by one or a plurality of equiangularly spaced studs 244 which are fixed to core 92 and axially project into bores formed in the rear face of piston 240. The braking face of piston 240 opposing pump impeller 90 is sloped to conform with the surface of the pump impeller so that the entire surface of the face abuttingly engages pump 90 when the former is shifted axially into engaging contact with the latter. In order to axially shift piston 240 toward pump impeller 90 fluid is introduced by means as will be described into the annular chamber 245 formed by the walls of core recess 242 and by piston 240.

Referring now to FIGURES 4 and 5, the means for actuating brakes 170, 172 and 240, and clutches 38 and 39 to selectively shift the transmission between forward, reverse, braking and neutral positions, comprises a hydraulic system having a gear pump 252 of any standard construction for delivering fluid under pressure to the system. In order to drive gear pump 252, a gear 253 is non-rotatably mounted on the end of the gear pump drive shaft 254 which constantly meshes with a gear 255 rigidly fixed on an annular shoulder formed integral with ring gear 46. By means of this structure continuous operation of gear pump 252 is established whenever input shaft 28 is rotated.

Transmission oil may be used for hydraulic fluid and is withdrawn by pump 252 from a transmission oil sump 256 (FIGURE 2) formed by housing 22 through inlet passage 258 to the pump inlet.

With continued reference to FIGURES 4 and 5, the outlet 260 of pump 252 is connected to a passage 262 formed in shafts 28 and 40 by means of a conduit 264. Passage 262 communicates with fluid passageway 91 of torque converter 36 so that hydraulic fluid delivered under pressure from the discharge of gear pump 252 is transmitted through conduit 264 and passage 262 into fluid passageway 91.

Hydraulic fluid is also delivered under pressure from the discharge of gear pump 252 through a fluid line 266 containing a check valve 267 to a control valve 270. Further supplying control valve 270 with hydraulic fluid is a conduit 268 which interconnects the toroidal fluid passageway 91 with line 266 between check valve 267 and control valve 270. Disposed in conduit 268 is a check valve 269 preventing flow of fluid from line 266 to passageway 91. By this construction, pressure fluid will be delivered from torque converter passageway 91 on the discharge side of pump impeller 90 to control valve 270 whenever the fluid pressure in passageway 91 is greater than the pressure of the fluid delivered by pump 252 into line 266.

Control valve 270 comprises a generally cylindrical valve body 272 and a rotatable valve plug 274 mounted for rotation in valve body 272 and having a longitudinally extending passage 276 permanently connected to fluid line 266. Control valve 270 is conveniently located for operation by the driver of the vehicle and may be provided with a selector lever (not shown) adapted to be connected to valve plug 274 so as to permit manipulation thereof.

With continued reference to FIGURE 5, plug 274 has three independent radially formed passages 278, 280 and 282 communicating respectively with longitudinal passage 276 and extending outwardly to the outer periphery of plug 274 adjacent valve body 272. The outer peripheral surface of plug 274 surrounding passages 278, 280 and 282 is cylindrically shaped and provides a fluid-tight fit with valve body 272. By this construction, fluid introduced into passages 278, 280 and 282 is prevented from passing between the outer periphery of plug 274 and valve body 272. An indicator 284 is secured to the periphery of plug 274 and extends beyond valve body 272 to indicate the selected operating position of the valve. Connected at circumferentially spaced points to valve body 272 for communication with the interior thereof are conduits 290, 292, 294 and 296.

In order to transmit pressure fluid to chamber 116 for actuating clutch piston 114, conduit 290 is connected to an annular peripheral groove 298 which is sealed off fluid-tight with the periphery of shaft 30. Connected to groove 298 is a channel 299 which opens into the right side of hydraulic pressure chamber 116 as viewed from FIGURE 2. Conduit 296 is connected to fluid chamber 220 of brake 172 to facilitate transmission of pressure fluid thereto for actuating brake piston 216. A branch duct 300 interconnects conduit 296 with an annular groove 301 surrounding shaft 30 which is sealed against communication with groove 298 and which communicates with a channel 302 formed in shafts 30 and 40. Channel 302 is connected to fluid chamber 152 of clutch 39 so as to facilitate transmission of pressure fluid from conduit 296 to chamber 152 for actuating clutch piston 150.

Introduction of pressure fluid into brake piston chamber 186 for actuating brake piston 182 of ring gear brake 170 is controlled by a reversing slide valve 304. Slide valve 304 comprises a valve body 305 and a spool type plunger 306 which is axially shiftably mounted in a bore 308 formed in valve body 305 and which is provided with a centrally reduced diameter section 310 forming an annular chamber 312 with the walls of bore 308. Plunger 306 is biased to the right as viewed from FIGURE 5 as by a spring 314 which reacts between valve body 305 and the left-hand planar end face of plunger 306. A fluid line 315 is connected to brake piston chamber 186 and to an outlet port 316 which communicates with the central portion of bore 308. An inlet port 318 establishes communication with bore 308 axially to the right of outlet port 316 and is connected to conduit 290 by means of a branch conduit 320. Port 318 is spaced axially to the right of port 316 at a predetermined distance which is less than the axial length of the reduced diameter plunger section 310. A second inlet port 322 establishes communication with bore 308 axially between ports 316 and 318 and is connected to valve body 272 by means of conduit 294.

The means for controlling actuation of slide valve 304 comprises a regulator valve 326 having a valve body 327 and a spool type plunger 328 which is axially mounted for sliding movement in a bore 330 formed in valve body 327 and which is provided with a central reduced diameter section 334 forming an annular chamber 336 with the side walls of bore 330. An inlet port 338 communicating with bore 330 is connected to fluid line 266 between check valve 267 and pump 252 by means of a branch duct 340. An outlet port 342 communicating with bore 330 is spaced axially to the left of inlet port 338 at a predetermined distance which is less than the axial length of the reduced diameter plunger section 334. Connected to outlet port 342 is a conduit 344 which communicates with the right hand end of bore 308 opposite from spring 314 so as to facilitate transmission of pressure fluid from regulator valve 326 to urge valve plunger 306 to the left against the bias of spring 314. A branch conduit 345 intersects conduit 344 and communicates with chamber 245 so as to transmit pressure fluid for actuating pump impeller brake piston 240 in torque converter 36.

In order to release the pressure established at the right hand end of plunger 306, a passageway 346 connects sump 256 with bore 330 axially to the left of outlet port 342 at a predetermined distance which is less than the axial length of the reduced diameter plunger section 334.

When plunger 328 is in the position shown in FIGURE 5, fluid communication is established between passage 346 and outlet port 342 through annular chamber 336 and fluid line 340 is closed off to prevent fluid communication between ports 342 and 338. Axial displacement of plunger 328 to the right from the position shown in FIGURE 5 interrupts communication between passage 346 and outlet port 342 and establishes communication between outlet port 342 and inlet port 338.

As shown in FIGURE 5, valve plunger 328 is biased to the left by means of a helical spring 352 which axially abuts the planar end face of plunger 328. Spring 352 is tensioned by movement of a pivotally mounted lever 354 which has a lateral extension 356 axially abutting a head plate 358 secured to the free end of spring 352. Lever 354 is connected to the engine throttle (not shown) so as to be pivoted in a counterclockwise direction by movement of the engine throttle to a position calling for an increase in engine power output. Movement of the engine throttle to positions calling for a reduction in engine power output pivots lever 354 in a clockwise direction thereby reducing the tension applied to spring 352. By this construction, it will be appreciated that spring 352 is selectively tensioned to apply an axial force to valve plunger 328 that corresponds in magnitude to the position of the engine throttle and tends to axially displace valve plunger 328 to the left as viewed from FIGURE 5.

Functioning to move valve plunger 328 to the right as viewed from FIGURE 5, is a conventional fly ball governor 362 mounted on a stub shaft 364 which is suitably journalled for rotation in housing 22. Non-rotatably mounted on shaft 364 is a gear 366 which is in meshing engagement with a gear 368 secured to output shaft 30. Fly ball governor 362 is positioned to abut the left-hand planar end face of valve plunger 328 to thereby apply an axial force to plunger 328 tending to shift it to the right against the bias of spring 352. By means of this structure, the force exerted by governor 362 for shifting plunger 328 against the bias of spring 352 is proportional to the speed of output shaft 30. Thus, as the speed of output shaft 30 increases the force applied by governor 362 to axially shift valve plunger 328 to the right is increased tending to establish communication between ports 338 and 342 for transmitting pressure fluid to axially displace valve plunger 306 to the left.

In operation of the transmission 20, gear pump 252 is continuously operated through the gear train established by gears 253 and 255 to draw oil from the oil sump 256 whenever shaft 28 is rotated. When control valve 270 is in a transmission neutral position corresponding to a rest position of the vehicle as shown in FIGURE 5, radial passage 282 is positioned angularly between conduits 290 and 292, radial passage 280 is aligned with conduit 292, and radial passage 278 is angularly positioned between conduits 294 and 296. Regulator valve plunger 328 is positioned to interrupt fluid flow between ports 338 and 342 and to establish communication between ports 342 and passage 346 through annular chamber 336 thus relieving pressure acting through conduit 344 to urge valve plunger 306 to the left. Under these conditions, spring 314 urges valve plunger 306 to the right to prevent pressure fluid from being supplied to the system from conduit 292 through valve 304. Thus, when pump 252 is operated to deliver pressure fluid to control valve 270 through check valve 267, only conduits 292 and 340 are filled with pressure fluid. Brakes 170, 172 and 240, and clutches 38 and 39 therefore are all disengaged so that input shaft 28 is disconnected from output shaft 30. Thus, no power is delivered from engine crankshaft 25 to transmission output shaft 30 and the vehicle therefore remains in a rest position.

In order to start the vehicle moving in a forward direction at slow speeds, control valve plug 274 is manually rotated counterclockwise from its neutral position shown in FIGURE 5 to a forward drive position shown in FIGURE 6. In this position of valve 270, radial passage 282 is now angularly shifted into alignment with conduit 290 while radial passage 280 is shifted to a position between conduits 290 and 292, and radial passage 278 is shifted to a position somewhat closer conduit 294 but still between conduits 294 and 296. In this position, supply of pressure fluid to conduits 292 and 294 and 296 is prevented through valve 270 and pressure fluid is transmitted through conduit 290 from control valve 270 to actuate clutch piston 114 of clutch assembly 38 and thereby drivingly couple gear carrier 70 of planetary gear set 37 with output shaft 30. Pressure fluid is also transmitted through conduit 320 and port 318 of valve 304 which communicates with port 316 through annular chamber 312. Pressure is thereby delivered from port 316 through conduit 315 to actuate brake piston 182 and thereby lock ring gear 76 of planetary gear set 37 against rotation. A drive connection is thereby established between input shaft 28 and output shaft 30. When the accelerator or engine throttle of the vehicle is depressed or moved to positions calling for increased output power to move the vehicle in a forward direction, the tension of spring 352 is increased and valve plunger 328 is biased more forcefully to the left as viewed from FIGURE 6 thereby continuing to prevent transmission of pressure fluid through regulator valve 326 to axially displace valve plunger 306 of valve 304. Under these conditions, clutch 39 and brakes 172 and 240 remain released while clutch 38 and ring gear brake 170 are engaged so that power introduced into transmission 20 is delivered to output shaft 30 hydraulically through torque converter 36 and mechanically through intermediate shaft 40 parallel to the hydraulic torque converter path.

As the vehicle begins to move forwardly, the speed of output shaft 30 and consequently the speed of shaft 364 on which fly ball governor 362 is operatively mounted increases. Thus, as speeds of shaft 30 and 364 increase, governor 362 exerts a correspondingly increasing axial force on valve plunger 328 tending to overcome the force of spring 352 and thereby tending to shift valve plunger 328 to the right toward open position where fluid communication is established between ports 338 and 342 through annular chamber 336 and where fluid communication between ports 342 and passage 346 is interrupted.

When the speed of shaft 30 reaches a predetermined value to produce a sufficient force by means of governor 362 for overcoming the bias of spring 352, valve plunger 328 is shifted gradually to the right to a position shown in FIGURE 7, thus opening branch duct 340 to conduits 344 and 345 by establishing communication between ports 338 and 342 through annular chamber 336. Hydraulic pressure fluid then is discharged from gear pump 252 through conduit 345 to annular brake piston chamber 245 (FIGURE 2) to axially shift brake piston 240 to the left toward the converter pump impeller 90 until it abuttingly engages pump impeller 90 and thereby frictionally arrests rotation thereof. The force applied to annular brake piston 240 is opposed by pressure fluid in the converter toroid 91 of torque converter 36 so as to cushion the braking force and thereby bring pump 90 shocklessly and smoothly to a stop without causing any abrupt or jerking action. This is accomplished largely on account of the characteristics of torque converter 36 in that the converter pump 90 naturally reduces the speed as the transmission output speed increases. This characteristic is fully explained in said co-pending application Serial No. 781,495 and serves when combined with the braking system for stopping rotation of pump impeller 90 to provide a completely shockless frictional braking of the torque converter pump. Due to the natural tendency of the converter pump 90 to slow down as the vehicle speed increases and the initial slight frictional contact of brake piston 240 with pump impeller 90, the consequent loss of pump speed results in a further reduction of fluid pressure in the converter toroid 91. Thus, the fluid pressure opposing the braking force is further decreased thereby enabling brake piston 240 to move more forcefully against pump 90.

Thus, it will be appreciated that by the gradual controlled application of brake 240, the pump speed of torque converter 36 is gradually reduced to zero over a range of transmission output speeds rather than abruptly reducing the speed of pump 90 to zero at a particular predetermined transmission output speed. As a result, the transmission torque output curve and more particularly the torque multiplication or ratio curve (torque output/torque input) is a substantially smooth continuous curve which gradually decreases in magnitude without abrupt decreases in any one particular transmission speed until the pump is fully braked and is therefore a constant linear value depending upon a gear ratio provided for in the planetary gear set 34.

When pump 90 of torque converter 36 is stopped and prevented from rotation by application of brake piston 240, sun gear 54, of planetary gear set 34, which is fixedly secured to pump 90 also is held stationary. Under this condition, all of the power transmitted to output shaft 30 is by way of the mechanical power train which proceeds from input shaft 28, through ring gear 46 and gear carrier 52 of gear set 34, through intermediate shaft 40 and through planet carrier 70 of gear set 37 which is coupled to output shaft 30 by engaged clutch assembly 38.

With continued reference to FIGURE 7, when regulator valve plunger 328 is axially displaced to the right for transmitting pressure fluid to actuate pump impeller piston 240, pressure fluid is concomitantly transmitted through conduit 344 to axially shift slide valve plunger 306 to the left thereby interrupting the supply of pressure fluid being delivered to brake piston chamber 186 through conduit 315. By this movement of valve plunger 306, brake piston 182 is released to permit rotation of ring gear 76, but clutch 38 remains engaged. Thus, as the vehicle moves at its high forward speed, transmission of torque from input shaft 28 to output shaft 30 is entirely through the mechanical torque transmitting path of the transmission and output shaft 30 remains coupled to intermediate shaft 40 through clutch 38.

In order to brake the speed of the vehicle when moving in a forward direction, under high speed conditions where brake piston 240 is applied to prevent rotation of torque converter pump impeller 90, plug 274 of control valve 270 is rotated in a counterclockwise direction from its forward position to a position indicated at brake as shown in FIGURE 8. In this position and with continued reference to FIGURE 8, radial passage 282 is shifted angularly to a position between conduits 290 and 296 while radial passage 280 is angularly shifted to a position where it aligns with conduit 290 and radial passage 278 is angularly shifted to a position where it aligns with conduit 294. Pressure fluid delivered by gear pump 252 is now transmitted through radial passage 280 and conduit 290 to continue to hold clutch piston 114 in a position where clutch 38 maintains shafts 40 and 30 coupled together. Since output shaft 30 is continuing to rotate with sufficient speed for providing governor 362 with enough force to maintain regulator valve plunger 328 in its right hand open position, pressure fluid will continue to act on slide valve plunger 306 to maintain it in its extreme left hand position. Pressure fluid delivered by gear pump 252 is now transmitted through radial passage 278 of control valve 270 which now aligns with conduit 294 to supply pressure fluid to conduit 375 through annular chamber 312 for actuating ring gear brake piston 182 so as to locking ring gear 76 against rotation. Pressure fluid is also delivered through passage 280 and conduit 290 to hold clutch piston 114 of clutch 38 in its actuated position thereby maintaining shafts 40 and 30 coupled together. Under these conditons, turbine 93 of torque converter 36 is rotated by shaft 30 whereby the braking action of the engine (not shown) is assisted by the braking action resulting from the fluid resistance within the torque converter.

With decreasing vehicle speed, valve plunger 328 of regulator valve 326 returns to its left hand position thereby interrupting the supply of pressure fluid from conduit 340 and opening port 342 to passage 346 so as to facilitate a release of fluid pressure acting on slide valve plunger 306. Spring 314 now biases valve plunger 306 to its position shown in FIGURE 6 where supply of pressure fluid for maintaining pump impeller brake piston 240 in its actuated position is interrupted. Thus, brake piston 240 is thereby released but brake 170 and clutch 38 remain actuated. Under these conditions, it will be appreciated that the same conditions are resumed as were described for the low forward speed of the vehicle and shown in FIGURE 6.

In order to reverse the movement of the vehicle, control valve plug 274 is rotated in a counterclockwise direction to a reverse position, as shown in FIGURE 9, wherein radial passage 282 is angularly shifted into alignment with conduit 296, while radial passage 280 is shifted to a position between conduits 290 and 296 and radial passage 278 is shifted to a position between conduits 292 and 294. Thus, pressure fluid delivered by pump 252 is transmitted through radial passage 282 and conduits 296 for actuating gear carrier brake piston 216 so as to lock gear carrier 70 of planeary gear set 37 against rotation. Pressure fluid is also transmitted through conduit 300 and channel 302 to actuate clutch piston 150 of clutch 39. In this position of control valve 270 it will be appreciated that clutch 39 and brake assembly 172 are engaged while clutch 38 and brakes 170 and 240 are released. Thus, under these conditions, reverse rotation of output shaft 32 is accomplished as hereinbefore described.

Referring now to FIGURES 10 and 11, a parking brake 378 assembly is provided for locking output shaft 30 against rotation and includes a pawl 380 pivotally mounted within housing 22 at 382 so as to rock about an axis extending parallel to shaft 30 as best shown in FIGURE 10. In the upright position shown in FIGURE 10, pawl 380 is adapted to engage with peripheral teeth 383, formed on brake wheel 108 so as to lock and hold output shaft 30 stationary. Housing 22 is formed with an aperture 384 providing access to the component parts of parking brake assembly 378 which is enclosed by a cover plate 386 secured to housing 22 as by screws 388.

A spring 390 functioning to bias pawl 380 into engagement with brake wheel 108 is mounted over a rigidly secured pin 392 and bears against the inside surface of cover plate 386. The right hand end of spring 390 engagingly passes under a pin 394 fixed to an arm 396 which is rigidly secured to pawl 380 between its forward brake wheel engaging end and pivot 382. By this construction, spring 390 reacts between cover 386 and pin 394 to biasingly urge pawl 380 about pivot 382 in a clockwise direction and into locking engagement with brake wheel 108.

In order to pivot pawl 380 against the bias of spring 390 and out of locking engagement with brake wheel 108, a lever 400 is provided as best shown in FIGURE 11 and is pivotally mounted about an axis extending normal to shaft 30 as by a pin 402 secured to cover plate 386. Lever 400 is preferably a bell crank having generally mutually perpendicular arms 404 and 406. Arm 404 passes over pin 394 so that by pivotal movement of lever 400 in a counterclockwise direction as viewed from FIGURE 11, arm 404 will bear against the top of pin 394 to urge pin 394 downwardly against the bias of spring 390 and to consequently pivot pawl 380 out of locking engagement with brake wheel 108.

In order to manually rotate lever 400, a cam 408 is provided and is keyed to a stub shaft 410 which is journalled in cover 386 about an axis parallel to the pivotal axis of lever 400. Shaft 410 extends beyond housing 22 and cover 386 for connection to a control member 411 which is manually manipulatable by the driver of the vehicle to selectively rotate cam 408 in opposed directions. As shown in FIGURE 11, arm 406 extends downwardly along side of cam 408 and has an integral lug 414 which engages cam 408 and functions as a follower.

In the position shown in FIGURES 10 and 11, pawl 380 is in locking engagement with brake wheel 108 and cam 408 is turned to a position where lever 400 is rotated by cam 408 to its extreme clockwise position (FIGURE 11) corresponding to the engagement of the parking brake. By now manually rotating cam 408 in a counterclockwise direction as viewed from FIGURE 11, lever 400 is pivoted in a corresponding direction to urge pin 394 downwardly against the bias of spring 390 and to thereby swing pawl 380 out of engagement with brake wheel 108. It will be appreciated that pawl 380 is rigidly held out of engagement with brake wheel 108 by rotation of cam 408 to its brake disengaging position. It is equally clear that lever 400 is continually biased by spring 392 to a brake engaging position.

With continued reference to FIGURE 11, cam 408 is provided with two circumferentially spaced apart notches 416 and 418 which correspond respectively to engaged and disengaged positions of the parking brake pawl 380. A spring 420 secured at one end to a bracket 422 which is rigidly fixed to cover 386 is provided with a free rounded end 424 generally corresponding in shape to notches 416 and 418 and bearing against cam 408. Spring end 424 is adapted to be posiitoned in either notch 416 or 418 when cam 408 is rotated to its brake engaging or disengaging positions. Thus, spring 420 functions to biasingly retain cam 408 in either its brake engaging or disengaging position and serves to prevent accidental movement from these positions. Rotation of cam 408 by means of control member 411 depresses spring 420 to force it out of notch 416 or 418.

Slidable mounted in a bore 427 formed in cover 386 along an axis normal to the rotational axis of lever 400 and adjacent to arm 406, is a piston 428 having a rounded end 430 extending beyond bore 427 and adapted to abuttingly engage the lower end of arm 406. Axial displacement of piston 428 to the right as viewed from FIGURE 11 by introduction of pressure fluid into the expansible chamber 432 formed by piston 428 with bore 427 is adapted to rotate lever 400 about its pivot 402. Thus, when lever 400 is pivoted to its extreme clockwise position by the force of spring 390 bearing against pin 394 and by movement of cam 408 to its position shown in FIGURE 11, arm 406 moves into abutment with end 430 of piston 428 in its extreme left hand position. In this position of lever 400, pawl 380 is in locking engagement with brake wheel 108.

Thus, by axial displacement of piston 428 to the right, lever 400 is swung about its axis in a counterclockwise direction to depress pin 394 against the force of spring 390 to swing pawl 380 out of engagement with brake wheel 108 and to thereby permit output shaft 30 to rotate freely.

In order to hydraulically operate piston 428, a passage 436 is formed in cover plate 386 which communicates with the fluid chamber 432 as best shown in FIGURE 10. Normally intersecting passage 436 is a short passage 438 extending to the interior face of cover plate 386 which abuts housing 22. When cover plate 386 is secured to housing 22, passage 438 registers with a channel 440 formed in housing 22 which communicates with a fluid line 442 (FIGURE 5) that is connected to the toroidal passageway 91 of torque converter 36 on the discharge side of pump 90.

Thus, by this construction, it will be appreciated that whenever the engine is started and connected to rotate transmission input shaft 28 and the torque converter fluid passageway 91 is filled with pressure fluid by operation of gear pump 252, piston 428 is displaced to swing lever 400 about its pivot 402 so as to depress pin 394 against the bias of spring 390 and thereby automatically disengage pawl 380 from brake wheel 108. Thus, if the driver forgets to disengage the parking brake before starting the engine, it will automatically be disengaged when fluid pressure is established in the torque converter. It is equally clear that the parking brake can only be applied when the engine is stopped and the pressure in torque converter 36 is relieved since fluid pressure in chamber 432 will maintain piston 428 in its extended position and thereby hold pawl 380 out of engagement with brake wheel 108.

Referring now to FIGURE 12, another construction embodying the principles of the invention is illustrated. Since most of the component parts illustrated in FIGURE 12 are the same as those disclosed and described in connection with the embodiment of FIGURES 1–11, identical reference numerals are used for identical parts and no detailed description thereof is required.

Accordingly, with continued reference to FIGURE 12, the planetary gear carrier 70 is fitted with a second set of planetary gears 450 and with an additional brake 452. By this structure, the driver may selectively change the gear ratio between input shaft 28 and output shaft 30 by optionally operating brakes 452 and 170.

As shown in FIGURE 12, pump impeller brake piston 240 may be optionally mounted in the portion of housing 22 forming the torque converter housing instead of core 92 as shown in the embodiment of FIGURES 1–11.

All clutches and brakes may be operated by mechanical, electrical, hydraulic or other means. Hydraulic operation is preferred since the gaseous or liquid pressure medium of the converter fluid circuit can be used for this purpose. Preferably, the different brake and clutch operating means are interconnected in such a way that for any shifting operation, the respective clutches are engaged and disengaged simultaneously with the brakes pertaining to them.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power shunt transmission having a drive shaft and a driven shaft, a first power splitting planetary gear mechanism driven by said drive shaft and having two separate differential outputs connected to the said drive shaft by ratio gear trains, a torque converter having a pump drive connected to one of said differential outputs and a turbine driven by the energy transmitted from said pump, rigid shaft means connected to the other of said differential outputs, a second planetary gear mechanism having a first input permanently rigidly connected to said turbine for completing a direct drive therebetween and having a second input connected to said shaft means for completing a direct drive therebetween, said second planetary gear mechanism further having a first output connected to said first and said second inputs by ratio gear trains and a second output directly connected to said second input and said shaft means, means for selectively locking said second input of said second planetary gear mechanism against rotation and means for selectively coupling said first output and said second output of said second planetary gear mechanism to said driven shaft, said means for selectively coupling said first and second outputs of said second planetary gear mechanism with said driven shaft comprising a first clutch operable to couple said second output of said second planetary gear mechanism with said driven shaft, a second clutch operable to couple said first output of said second planetary gear mechanism with said driven shaft, a first brake associated with said second output of said second planetary gear mechanism and operable to retard transmission of power therefrom, and a second brake associated with said first output of said second planetary gear mechanism to retard transmission of power therefrom.

2. The transmission defined in claim 1 wherein said pump of said torque converter is associated with a third brake operable to prevent rotation of said pump.

3. The transmission defined in claim 2 comprising means operable at a predetermined speed of said output shaft to automatically actuate said first and third brakes.

4. The transmission as defined in claim 1 wherein control means are provided for selectively operating said first clutch concomitantly with said second brake and said second clutch concomitantly with said first brake.

5. The transmission as defined in claim 4 wherein said control means comprises a hydraulic fluid circuit for operating said first and second clutches and said first and second brakes, a pump for charging said fluid circuit with pressure fluid and a manually manipulatable control valve in said fluid circuit for controlling the transmission of pressure fluid to said first and second clutches and said first and second brakes.

6. The transmission as defined in claim 4 wherein means are included for concomitantly rendering said first clutch operable and said second clutch together with said first and second brakes inoperable.

7. The transmission as defined in claim 6 wherein said torque converter pump connected to said one of said differential outputs for driving said turbine is provided with a brake means operable when actuated to prevent movement of said pump, and means operable to automatically actuate said brake means whenever said first and second brakes together with said second clutch are rendered inoperable and said first clutch is rendered operable.

8. In a power shunt transmission having a drive shaft and a driven shaft, a power splitting differential gear mechanism driven by said drive shaft and having two separate differential outputs connected to said drive shaft by ratio gear trains, a first power train drivingly connected to one of said differential outputs, a torque converter forming a part of said power train and having a pump and a turbine driven by the energy transmitted from said pump with said pump being drive connected to said one differential output, a planetary gear mechanism having a sun gear rigidly connected to said turbine for completing a direct drive therebetween, at least one pinion meshing with said sun gear, a carrier for said pinion, and an outer gear meshing with said pinion, means rigidly connecting said carrier to the other of said differential outputs for completing a direct permanent drive therebetween, and means for selectively locking said outer gear against rotation and for connecting said outer gear to said driven shaft.

9. In a power shunt transmission having a drive shaft and a driven shaft, a first power splitting planetary gear mechanism driven by said drive shaft and having two separate differential outputs connected to said drive shaft by ratio gear trains, a torque converter having a pump drive connected to one of said differential outputs and a turbine driven by the energy transmitted from said pump, rigid shaft means connected to the other of said differential outputs, a second planetary gear mechanism having a first input permanently rigidly connected to said turbine for completing a direct drive therebetween and having a second input connected to said shaft means for completing a direct drive therebetween, said second planetary gear mechanism having furthermore an output connected to said first and second input by ratio gear trains, means for selectively locking said second input of said second planetary gear mechanism against rotation and means for selectively coupling said output of said second planetary gear mechanism to said driven shaft and said shaft means to said driven shaft.

10. In a power shunt transmission having a drive shaft and a driven shaft, a first power splitting planetary gear set having an outer gear drivingly connected to said drive shaft, at least one pinion meshing with said outer gear, a planetary carrier for said pinion and a sun gear meshing with said pinion; a torque converter having a pump drive connnected to said sun gear and a turbine driven by the energy produced by said pump; a second planetary gear set having a sun gear permanently drive connected to said turbine, at least one pinion meshing with said sun gear, a carrier for said pinion and an outer gear meshing with said pinion; unitary shaft means permanently drivingly interconnecting the carrier of said first planetary gear set with the carrier of said second planetary gear set for completing a direct drive therebetween; and shifting means cooperating with said second planetary gear set selectively enabling the transmission of power to said driven shaft in one direction of rotation by power splitting and in the other direction of rotation only by way of said torque converter, said shifting means comprising a first clutch selectively operable to couple said unitary shaft means with said driven shaft, a second clutch selectively operable to couple said outer gear of said second planetary gear set with said driven shaft, and first and second brakes for selectively locking said carrier and said outer gear of said second planetary gear set respectively.

11. In a hydrodynamic power shunt transmission having a power input shaft and a power output shaft, a first power train, a hydrodynamic torque converter forming a part of said first power train, a second power train formed only with mechanical power transmitting components, differential gear means coupling said first and second power trains to said input shaft to transmit power delivered by said input shaft to said first and second power trains in parallel, a planetary gear set having separate first and second rotatable members respectively permanently coupled to said first power train and to said second power train, first control means cooperating with said planetary gear set selectively for effecting delivery of torque concomitantly and continuously from both of said power trains in a first operating torque delivery stage to rotate said output in one direction, and second control means cooperating with said planetary gear set for selectively effecting delivery of torque only from said first drive train in a second torque delivery stage to rotate said output in a direction opposite to said one direction.

12. The transmission defined in claim 11 wherein said second drive train comprises a permanent rigid shaft connection completing a direct uninterruptable drive from said differential gear means to said second member of said planetary gear set.

13. The transmission defined in claim 11 wherein said torque converter comprises a pump drive coupled to said differential gear means and a turbine energizable by actuation of said pump and drive connected to said first member of said planetary gear set.

References Cited in the file of this patent

UNITED STATES PATENTS

| | | |
|---|---|---|
| 2,176,105 | Schneider | Oct. 17, 1939 |
| 2,616,308 | Burnett | Nov. 4, 1952 |
| 2,625,057 | Kelbel | Jan. 13, 1953 |
| 2,670,064 | Hasbany | Feb. 23, 1954 |
| 2,682,786 | Flinn | July 6, 1954 |
| 2,706,419 | Kelbel | Apr. 19, 1955 |
| 2,720,124 | Polomski | Oct. 11, 1955 |
| 2,725,762 | Hettinger et al. | Dec. 6, 1955 |
| 2,815,684 | Roche | Dec. 10, 1957 |
| 2,912,085 | De Lorean | Nov. 10, 1959 |
| 2,924,992 | Edsall | Feb. 16, 1960 |
| 2,950,629 | Holdeman et al. | Aug. 30, 1960 |

FOREIGN PATENTS

| | | |
|---|---|---|
| 485,657 | Italy | Oct. 16, 1953 |